United States Patent [19]
Zieve et al.

[11] Patent Number: 5,280,673
[45] Date of Patent: Jan. 25, 1994

[54] ELECTROMAGNETIC BOLT INSERTION SYSTEM

[75] Inventors: Peter B. Zieve; John L. Hartmann; Peter W. Janicki, all of Seattle; Michael D. Assadi, Kirkland; Scott C. Tomchick, Seattle, all of Wash.

[73] Assignee: Electroimpact, Inc., Seattle, Wash.

[21] Appl. No.: 839,933

[22] Filed: Feb. 21, 1992

[51] Int. Cl.⁵ .............................. B23P 11/00
[52] U.S. Cl. .............................. 29/718; 29/243.54; 72/56; 72/430; 227/10
[58] Field of Search .............. 29/525, 525.1, 525.2, 29/714, 718, 243.53, 243.54; 227/9, 10; 72/56, 430; 310/27; 318/114, 130

[56] References Cited

U.S. PATENT DOCUMENTS

| | | | |
|---|---|---|---|
| 3,559,269 | 2/1971 | Schmitt et al. | 29/243.54 |
| 3,704,506 | 12/1972 | Orr et al. | 29/243.54 |
| 4,132,108 | 1/1979 | Hogenhout | 72/430 |
| 4,151,735 | 5/1979 | McDermott | 29/243.54 X |
| 4,468,594 | 8/1984 | Jacquemet | 318/130 |
| 4,862,043 | 8/1989 | Zieve | 29/243.54 X |

Primary Examiner—Timothy V. Eley
Attorney, Agent, or Firm—Jensen & Puntigam

[57] ABSTRACT

The bolt insertion apparatus includes a driver which is partially contained within an interior volume defined by an inner cylindrical sleeve which is secured at its front end to a forward mass portion of the apparatus. An actuator coil is also positioned within the interior volume for electromagnetic actuation of the driver. An outer cylindrical sleeve includes a recoil mass at the rear end thereof, with the coil extending forwardly from the recoil mass into the interior volume of the inner sleeve. The outer sleeve is movable longitudinally relative to the inner sleeve. A spacer element is selectively removable between a forward end of the apparatus and a clamp-up nosepiece member. The apparatus is initially positioned such that there is a gap between a tool on the end of the driver and the head of the bolt. The collar-swaging apparatus includes a driver element mounted for longitudinal movement. A collar transfer arm is mounted for rotational movement into and out of the longitudinal axis of movement of the driver, for insertion of a collar onto a die which is attached to the driver. A collar-swaging die includes two portions which are slidable relative to each other for alignment of the collar onto the exposed end of the bolt. A collar-swaging apparatus includes an inner sleeve and an outer sleeve which are arranged relative to each other so that recoil of the recoil mass, with corresponding movement of the inner sleeve and a hardstop element, results in contact between the hardstop and the driver, and subsequent rearward movement of the driver results in the removal of swaging tool from the collar.

28 Claims, 6 Drawing Sheets

ELECTROMAGNETIC BOLT INSERTION SYSTEM

DESCRIPTION

1. Technical Field

This invention relates generally to the art of bolt insertion (involving an interference fit) and collar swaging systems, such as used in the assembly of aircraft and other large scale assembly operations, and more particularly concerns such a system which uses electromagnetic actuators.

2. Background Of The Invention

In the manufacture of aircraft, as well as other large scale assemblies which require a large number of fasteners, bolts are frequently used to fasten two or more parts together. The assembly of an aircraft wing, involving stringers, spars and panels, is an example. In general, bolts are an alternative to rivets for fastening purposes, but are preferable to rivets and other fasteners in many situations. For instance, bolts are typically stronger than rivets, and thereby provide better overall damage protection in the event of a partially broken part. Further, bolts are typically more reliable when a relatively thick stack of parts is to be fastened.

When bolts are used to fasten two parts, such as the use of titanium bolts in an aluminum aircraft structure, they are driven through the parts to be fastened in a manner to form what is known as an interference fit, where the opening through the parts is slightly smaller (typically several thousandths of an inch) than the shank of the bolt which is to be inserted therein. To achieve an interference fit, the bolts must be driven into the opening with considerable force. Compressive stress between the bolt and the parts is produced, which typically results in increased fatigue life for the joint.

Generally, however, the current techniques for producing an interference fit in the aircraft industry have several significant disadvantages. In a first technique, a bolt is driven into the opening through the parts with a pneumatic rivet gun. Typically, a rivet gun includes a driver mass, which is moved at high velocity along a barrel by means of air pressure. The mass strikes an anvil which in turn hits the head of the bolt, which has been previously positioned in the opening, with several sharp blows, until the bolt is fully inserted. Pneumatic guns, however, are very loud and are labor-intensive in use.

Second, a hydraulic driver has been used to achieve an interference fit with bolts. Typically, the hydraulic driver is used with large, C-shaped riveting machines, which reach around the aircraft or other parts to be fastened. Such equipment, however, is extremely large, cumbersome to operate, and expensive. In addition, with a hydraulic driver, the shank of the bolt is put into compression, which results in the diameter of the bolt shank swelling upon insertion, which in turn increases the required insertion force. This in turn may have a negative effect on the stress condition of the bolt in the opening.

A third technique is used with a pintail-type bolt, which has a free end portion which is smaller than the remainder of the bolt. The small diameter free end of the bolt is first passed through the opening through the parts to be fastened to the point where the small end (the pintail) clears the opening. A hydraulic tool then pulls on the pintail from the rear, drawing the bolt into the opening. Special tools are necessary to clamp onto the pintail and to pull the bolt through the opening, into an interference fit. This process is expensive and is labor-intensive.

Lastly, an electromagnetic bolt insertion system is shown in U.S. Pat. No. 3,945,109 to Leftheris. However, the Leftheris system requires extremely high voltage and is not practical in operation. In the Leftheris system, the driver is initially positioned against the head of the bolt to be driven. A specially designed driver, coil and power supply are required. However, safety and reliability concerns, as well as expense, has prevented any use of such a system.

DISCLOSURE OF THE INVENTION

The invention includes an electromagnetic apparatus for insertion of bolts having a head portion into an opening in a workpiece to produce an interference fit, comprising: a driver means having a first portion which is adapted to receive a tool or the like for impact against the head of the bolt in order to drive the bolt into the opening in the workpiece; an actuator system which includes an actuator member which is receptive to the establishment of eddy currents therein and a coil which is positionable in close proximity to said actuator member, wherein one of the coil and the actuator member is connected to the driver; a source of stored charge to produce a large, short duration current pulse through the coil when connected thereto; means for initially positioning the driver such that there is an initial gap between the tool and the head portion of the bolt; and control means for selectively connecting the stored charge to the coil to produce the large, short duration pulse in the coil which in turn results in eddy currents being established in the actuator member, repelling the driver means toward the workpiece with sufficient force that the driver means obtains a momentum prior to impact between the tool and the head of the bolt which is sufficient to drive the bolt into the opening in an interference fit.

Another feature of the invention concerns an apparatus for automatically transferring collars, which are to be swaged onto an exposed end of a bolt, to a collar holder member of a collar swaging apparatus, comprising: a collar transfer arm, said transfer arm being supported for movement between two positions, wherein the one portion of the transfer arm includes an element for receiving a collar; means for moving a collar onto the collar-receiving element on one portion of the arm; means for moving the transfer arm between said two positions, wherein in one position the collar on the collar receiving element is in axial alignment with the collar holder member on the collar swaging apparatus and wherein in the other position the collar-receiving element is relatively away from the axis of movement of a driver portion of the collar swaging apparatus to which the collar holder member is attached; and means for transferring the collar from the collar receiving element to the collar holder member when the transfer arm is in the one position.

Another feature of the present invention includes a collar swaging die, comprising: a first swaging die portion mountable to a front end portion of a collar-swaging driver element which is mounted for longitudinal movement in the direction of an exposed end of a bolt onto which a collar is to be swaged; and a second swaging die portion which is mounted to a forward end of the first portion, the second portion adapted to hold a swaging tool at a forward end thereof, the swaging tool in turn being adapted to hold a collar at the front end thereof, the swaging tool including a member extending therefrom for contacting the bolt in such a manner that movement of said second portion of the die relative to said first portion occurs to align the collar with the end of the bolt.

Still another feature of the present invention is an apparatus for swaging collars onto a bolt, adapted for automatic removal of the die from the swaged collar, comprising: a driver member which includes a collar-swaging die at a front end thereof and an actuator plate at a rear end thereof; an electromagnetic actuator, including an actuator coil positioned to the rear of the driver; an inner sleeve member having a recoil mass at the rear end thereof, the coil extending forwardly from the recoil mass within the sleeve member; a member extending within the inner sleeve member at the front end thereof; and an outer sleeve member which is positioned around the inner sleeve member, the outer sleeve member including a forward portion having a central opening through which the driver extends, wherein a rear portion of the driver, including the actuator plate, is positioned between the coil and the stop element, such that, following actuation of the driver and subsequent rearward movement of the recoil mass, the stop contacts the rear portion of the driver, and further rearward movement of the recoil mass moves the swaging die away from the swaged collar.

Other features of the present invention include first, a particular body assembly for housing the driver means and the actuator system, the body assembly including a forward member having a central opening therein through which an extending portion of the driver extends, and an inner sleeve member connected to and extending rearwardly from a rear surface of the forward member, wherein the apparatus further includes an outer sleeve member which fits around the inner sleeve member and which includes a recoil mass at the rear end thereof, wherein the coil is connected to the recoil mass and extends forwardly thereof, the coil being configured to fit within the inner sleeve member, the outer sleeve member being movable longitudinally relative to the inner sleeve member. Secondly, an apparatus with a forward member includes a hardstop element positioned on the rear surface of the forward member, which a portion of the driver contacts, thereby stopping the driver and absorbing a substantial portion of the energy in the driver means. These last features are usable with electromagnetic apparatus used in various fastening operations, including those with bolts and rivets, among others.

BEST MODE FOR CARRYING OUT THE INVENTION

Figure 1A:
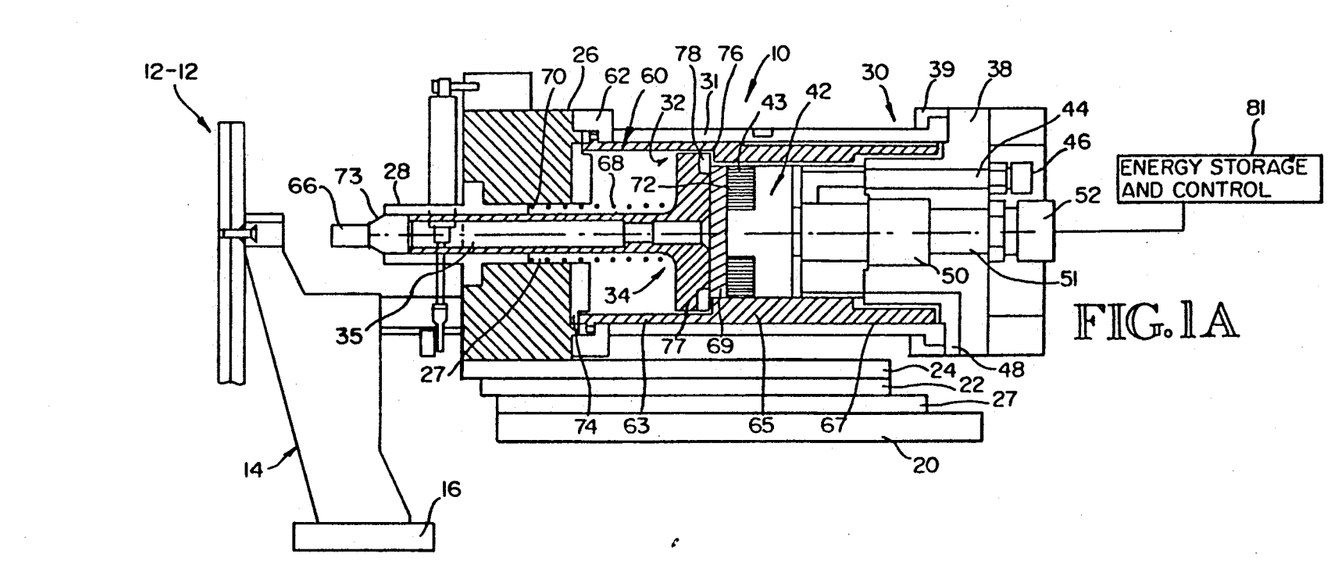
FIGS. 1A and 1B are, respectively, a partial cross-section, elevational view and a simplified plan view of the electromagnetic bolt insertion apparatus of the present invention.
Figure 1B:
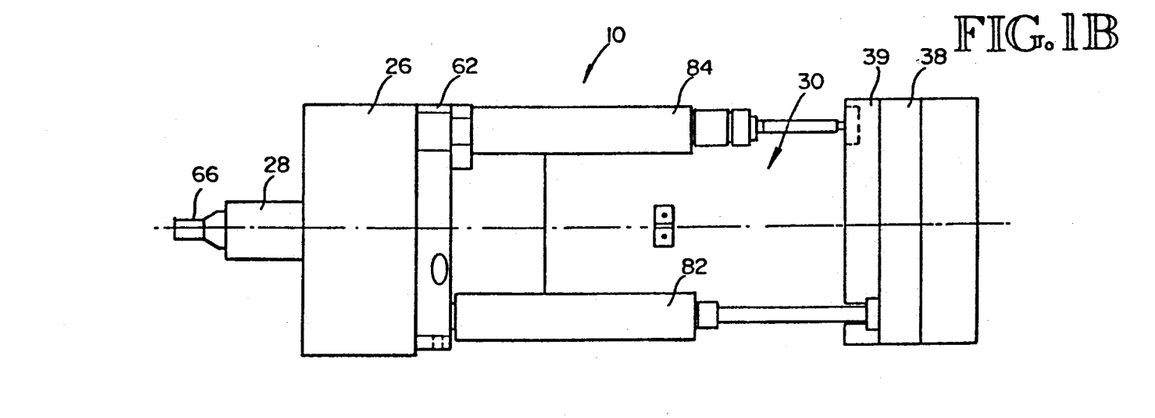

FIG. 1 shows the basic electromagnetic (EM) bolt insertion apparatus of the present invention. The EM apparatus, which is referred to generally at 10, is shown relative to parts 12—12 (referred to hereinafter as the workpiece) which are to be fastened together by a bolt in an interference fit in an opening through the workpiece 12—12. A fixed clamp-up nose member shown generally at 14 is located between the workpiece 12—12 and the bolt insertion apparatus 10. The clamp-up nose member includes a base 16 which is secured to a fixed system base (not shown). The clamp-up nose member includes a central opening 18 which permits a forward end of a driver portion of bolt insertion apparatus 10 to move therethrough to impact the head of the bolt. The clamp-up nose piece may conveniently take various configurations.

The bolt insertion apparatus 10 is supported on a fixed shuttle table 20, which in turn is mounted on the system base. The bolt insertion apparatus 10 is secured to a plate 24 which in turn is longitudinally slidably supported on a bearing surface 22, with bearing surface 22 in turn being connected to an intermediate support plate 27 which is secured to shuttle table 20. The bolt insertion apparatus 10 includes a forward mass 26, which has a central opening 27 therethrough. Forward mass 26 includes a hollow cylindrical nosepiece 28 which is bolted to the front surface of the forward mass and extends forwardly therefrom to define a forward continuation of central opening 27, as well as extending rearwardly a short distance back into the central opening in forward mass 26. In the embodiment shown, forward mass 26 is approximately 6¼ inches in diameter and approximately 3 inches thick. Central opening 27 is approximately 1½ inches in diameter for the embodiment shown, which is for bolts up to ⅝ inches in diameter. These dimensions of course can be varied. The nosepiece 28 extends forwardly of forward mass 26 approximately 2⅛ inches and back into the central opening 27 approximately 1⅛ inches.

Positioned to the rear of forward mass 26 is an outer sleeve assembly referred to generally at 30, and an inner sleeve assembly referred to generally at 32. Positioned in an interior volume defined within inner sleeve assembly 32 is a driver element shown generally at 34, a portion 35 of which extends forwardly through central opening 27 in the forward mass 26 and beyond the forward end of nosepiece 28. A tool 66 is attached to the forward end of extending portion 35 of the driver.

Outer sleeve assembly 30 includes a hollow cylindrical sleeve 31 approximately 9 inches long, 5¼ inches in diameter, and ¼ inch thick in the embodiment shown. At the rear end of cylindrical sleeve 31 is a recoil mass 38. A circular collar 39 secures recoil mass 38 to cylindrical sleeve 31. Positioned forwardly of recoil mass 38 and extending therefrom is a coil assembly 42 which comprises a flat circular pancake coil 43 having a diameter of approximately 3⅞ inches, with approximately 16½ turns in the embodiment shown, although this can be varied, as required. An air-circulation conduit 44 extends through recoil mass 38 and includes an entry port 46 and an exit port 48. The air-circulation conduit 44 permits air to proceed through the recoil mass to the coil assembly 42. The coil assembly 42 has openings formed therein so that air can circulate through coil assembly 42 and remove heat produced by the coil during operation of the apparatus. Located down the longitudinal center of recoil mass 38 is an opening 51 for the electrical leads (not shown) for coil 43. A clamp 50 is provided for the leads, as well as a strain-relief clamp 52, which is located at the rear end of outer sleeve assembly 30.

The inner sleeve assembly 32 includes an inner cylindrical sleeve 60 which fits just inside outer cylindrical sleeve 31. Positioned at the forward end of inner cylindrical sleeve 60, around the exterior periphery thereof, is a circular collar 62 which in the embodiment shown secures together forward mass 26 and inner cylindrical sleeve 60. In the embodiment shown, inner cylindrical sleeve is 9⅝ inches long, with the internal diameter varying over the length thereof, with a first section 63 approximately 4.30 inches; a second, intermediate section 65 approximately 3.67 inches and a third section 67 approximately 4.06 inches.

The coil assembly 42, which is within the interior volume of the inner cylindrical sleeve 60, has a diameter which is slightly smaller than the diameter of intermediate section 65 of inner cylindrical sleeve 60. The driver 34 includes a metallic, i.e., copper rear plate portion 69 which is approximately 3½ inches in diameter and ¼ inch thick, a central portion 77 and the extending forward portion 35 which in the embodiment shown is approximately 10 inches long and, as indicated above, extends through central opening 27 in the forward mass 26 through nosepiece 28. At the forwardmost end 73 of extending portion 35 is die 66, which contacts the head of the bolt to be inserted.

A spring 68 extends between the rear end 70 of nosepiece 28, around extending portion 35 of the driver to the front surface of central portion 77. The spring 68 tends to maintain the driver biased toward the rear of the apparatus, such that the rear plate 69 is in contact with the front surface 72 of coil 43.

The apparatus further includes a forward hardstop element 74 and a rear stop 76 for the driver. Forward hardstop 74 in the embodiment shown is a plate of polyurethane plastic, approximately ¼ inch thick, which is positioned at the rear end of forward mass 26 and is attached thereto by means of screws and the like. While various materials could be used, high density polyurethane is effective in breaking up destructive shock waves in the forward mass 26 and absorbs a considerable amount of energy from the driver without damage, energy which is in the driver beyond that necessary to insert the bolt. Other materials, however, could be used. The boundary surface or ledge between the first and second sections of the interior surface of inner cylindrical sleeve 60 forms the rear stop 76. At the rear peripheral edge of central portion 77 of driver 74 is a polyurethane ring 78 which comes into contact with the rear stop 76 upon sufficient rearward movement of the driver, during recoil thereof.

The above-described relationship of inner sleeve assembly 30 and outer sleeve assembly 32 results in those two assemblies being slidable longitudinally relative to each other. At the four exterior longitudinal corners of the apparatus, as shown in FIG. 1B, extending between front collar 62 and rear collar 39 are a sequence of air cylinders 82 and recoil elements 84, with air cylinders 82 and recoil elements 84, respectively, being alternately positioned around the periphery of the apparatus. The air cylinders are used to position the two assemblies relative to each other, while the recoil elements absorb the recoil of the two assemblies after the unit has been fired, as described below.

Figure 2:
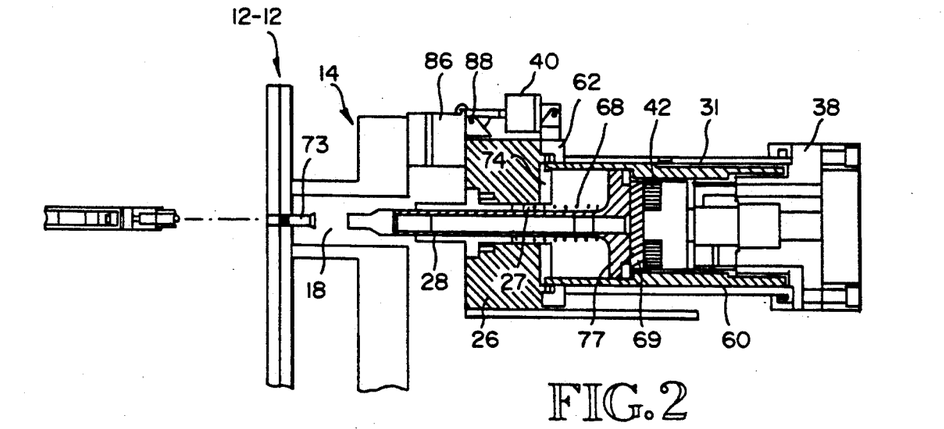
FIG. 2 is a partial cross-section, top plan view of the bolt insertion apparatus of FIG. 1, showing a first step in the process of bolt insertion.
Figure 3:
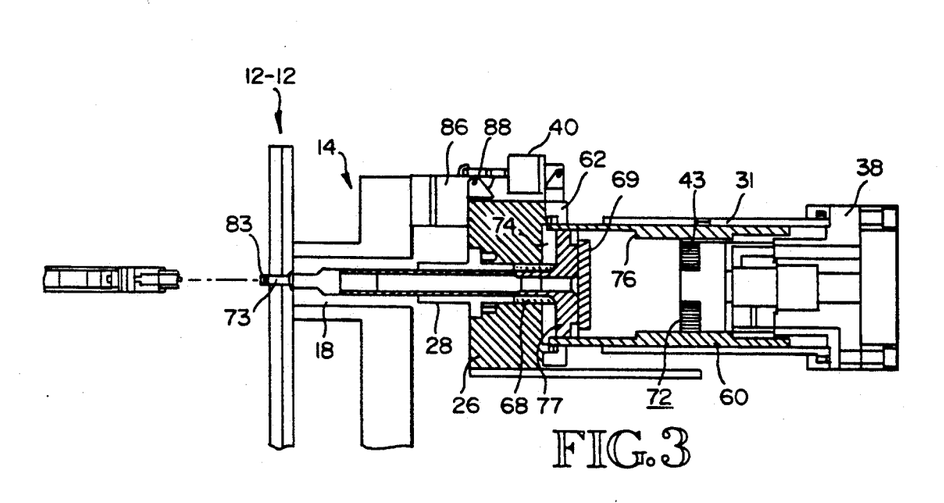
FIG. 3 is a view similar to FIG. 2, showing a further step in the process of bolt insertion.
Figure 4:
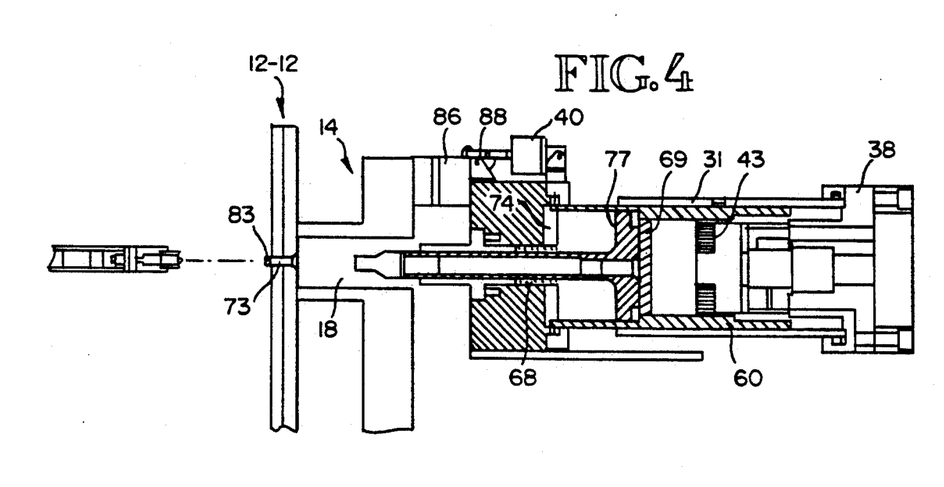
FIG. 4 is a view similar to FIGS. 2 and 3 showing the completion of bolt insertion.
Figure 5:
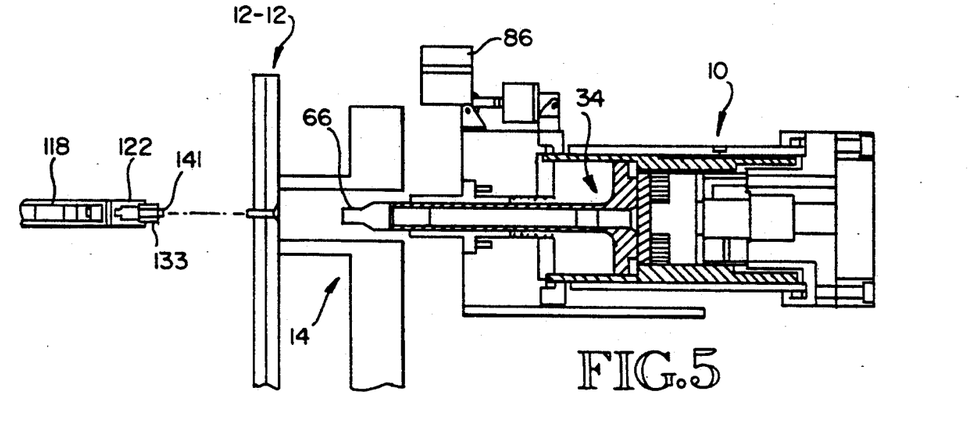
FIG. 5 is a partial cross-section, top plan view showing the first step in the swaging of a collar onto the exposed tip of an inserted bolt, using the apparatus of the present invention.
Figure 6:
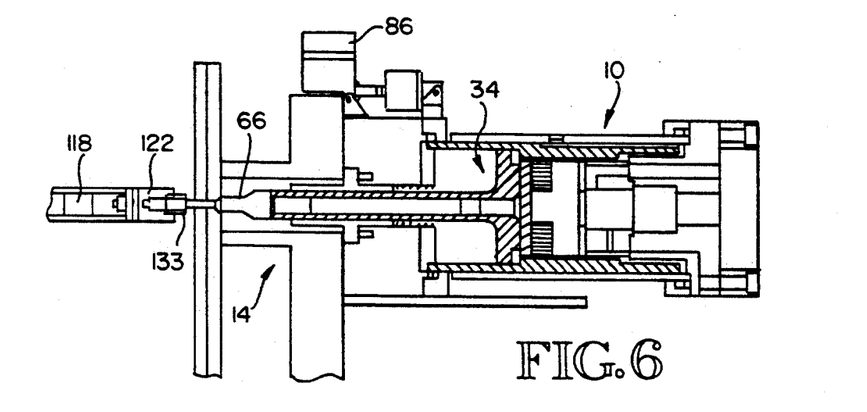
FIG. 6 is a view similar to FIG. 5 showing a further step in the process of collar swaging.
Figure 7:
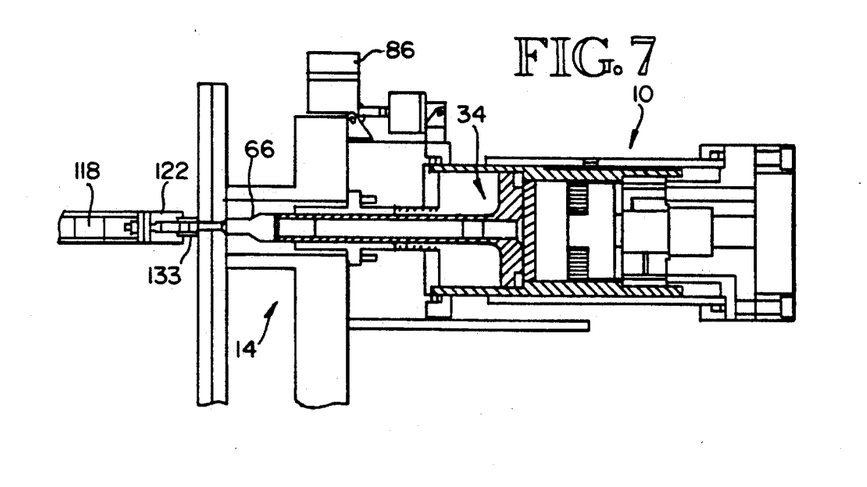
FIG. 7 is a view similar to FIGS. 5 and 6 showing a still further step in the collar swaging process.

At the forward end of the apparatus, shown in FIGS. 2-4 most clearly, is a spacer member 86 which in the embodiment shown is pivotable about pivot point 88. Spacer 86 is connected to the arm of an air cylinder 90, which is fixed to forward mass 26, resulting in spacer 86 being movable, in and out between the front end of forward mass 26 and the clamp-up nosepiece 14, as shown in FIGS. 5-7. The design and arrangement of spacer member 86 may be varied.

In operation of the apparatus, spacer 86 is initially positioned between forward mass 26 and clamp-up nosepiece 14. The combination of forward mass 26 and inner sleeve assembly 32 is initially positioned relative to outer sleeve assembly 30, including the recoil mass 38 and the coil assembly 42, by means of air cylinders 82. The tip of die 66 on the forward end of the driver 34 is positioned some distance away from the head of a bolt 73 to be inserted. The distance or gap between the two, typically is within the range of 0.1 to 4 inches (although it could be larger, depending on the configuration of the apparatus) and is important for proper operation of the apparatus, as described in more detail below. The rear surface of rear plate portion 69 of the driver is furthermore initially up against the front surface 72 of coil 43. The gap between the forward end of die 66 and the head of the bolt 73 closes when the apparatus is fired, the driver 74 moving forward only enough to close the gap and then properly insert the bolt firmly into the opening in the workpiece in an interference fit before the front of the central portion 77 of the driver comes into contact with hardstop 74, which stops the forward movement of the driver. Additional shock absorbing elements, such as a foam bumper or even a spring, could be provided between driver and hardstop 74. The overall arrangement is such that driver 34 is only permitted to go sufficiently forwardly to drive the bolt properly into the opening and no further. If a bolt is overdriven down into the workpiece, damage can occur to the head of the bolt or the workpiece. Conversely, if the bolt is underdriven, the head of a flush head bolt will protrude above the surface of the workpiece, or in the case of a protruding head, a gap could be left under the head of the bolt, both of which are undesirable.

In initial operation, when spring 68 (or some alternative means, such as air pressure) pushes rear plate portion 69 of the driver up against the front surface 72 of the coil 43, a capacitor bank which is part of an actuator and control system shown generally at 81 (FIG. 1A), which has been previously charged, is discharged into coil 43, and a very large current pulse is produced in coil 43 which in turn produces large eddy currents in rear plate 69. This results in a large repulsion force between coil 43 and driver 34, forcing the driver forwardly with a large amount of force against the bolt head, producing an interference bit. This is in accordance with the operation of conventional electromagnetic systems, such as described in more detail in U.S. Pat. No. 4,862,043 to Peter Zieve, which is incorporated by reference herein. Although the apparatus will likely be operated with relatively low voltage i.e. 300–600 volts, high voltage could be used (up to 10K volts).

The initial gap between the front end of die 66 and the bolt head is important to proper operation of the system, as it permits the driver 34 to gain substantial speed, typically in the range of 1–20 meters per second, before contacting the bolt head. The result of this arrangement is that the driver becomes in effect a high speed ballistic object, and produces the required shockwaves in the bolt for the interference fit. The shockwaves travel up and down the bolt, at a velocity of approximately 15,000 feet per second for titanium (the speed of sound in titanium). For a 1½ inch bolt, a shockwave will require 17 microseconds to travel up and back down the bolt. The shockwaves enhance the ability of the bolt to enter the opening, and superior fatigue characteristics result. Substantial energy is also saved with a ballistic driver relative to a conventional bolt driving system.

The driver 34 will hit the forward hardstop 74, which as explained above is relatively positioned so that the bolt is driven the required depth into the hole, without overdriving or underdriving. The forward mass 26 to which hardstop 74 is connected is usually several times larger than the mass of driver 34 so as to help absorb and reflect the kinetic energy of the driver. The hardstop 74 itself absorbs a substantial amount of energy, such that it is useful with a forward member of relatively low mass, such as a plate. The forward mass 26, which is in line with the motion of the driver, reduces the amount of shock transmitted through the spacer element 86 and improves the performance characteristics of the system.

Driver 34, after hitting hardstop 74, will rebound towards the rear of the apparatus. Considerable elastic energy is stored in the driver. This would ordinarily result in significant damage to coil 43 if driver 34 were to strike coil 43 in its rearward movement. However, as explained above, coil assembly 42 is connected to outer sleeve assembly 30. After discharge of the capacitor bank, coil assembly 42, with recoil mass 38 and outer sleeve assembly 30, moves backward, with the forward surface 72 of coil 43 clearing boundary ledge 76 by a sufficient distance to prevent contact between the driver and the coil. This is shown most clearly in FIG. 3. This occurs as the driver 34 is traveling forward to insert the bolt and then rebounding. The coil assembly 42, while traveling to the rear much slower than the driver is moving, moves back sufficiently, as little as 0.05 inches, to clear the boundary ledge backstop 76 before the arrival of the rebounding driver. Outer ring 78 on the rear surface of central portion 77 of driver 34 comes into contact with boundary ledge backstop 76, stopping the driver. An additional shock absorbing element, such as a spring or foam bumper, could be used to help absorb the impact.

The apparatus is now ready for the next bolt insertion, and air cylinders 82 are used to reposition outer sleeve assembly 30 relative to inner sleeve assembly 32, with driver 34 being ready for the next action. The capacitor bank is recharged from a source of voltage.

The spacer element 86, which is movable into and out of the space between the forward mass 26 and the clamp-up nosepiece 14, is adjustable in size, either manually or automatically, to establish a desired stop position relative to the forward movement of the driver 34 to accommodate a variety of bolt head heights. Hardstop 74 can also be made adjustable in thickness so as to achieve a variable travel capability for the driver.

The above described apparatus can, with some modification, be used with rivets or to back up a collar swaging apparatus, as described below and can be used with a feeder system which automatically feeds and/or positions bolts or rivets. The bolt insertion apparatus can also be configured in a hand-held embodiment, with the spacer element mounted on the apparatus.

Figure 17:
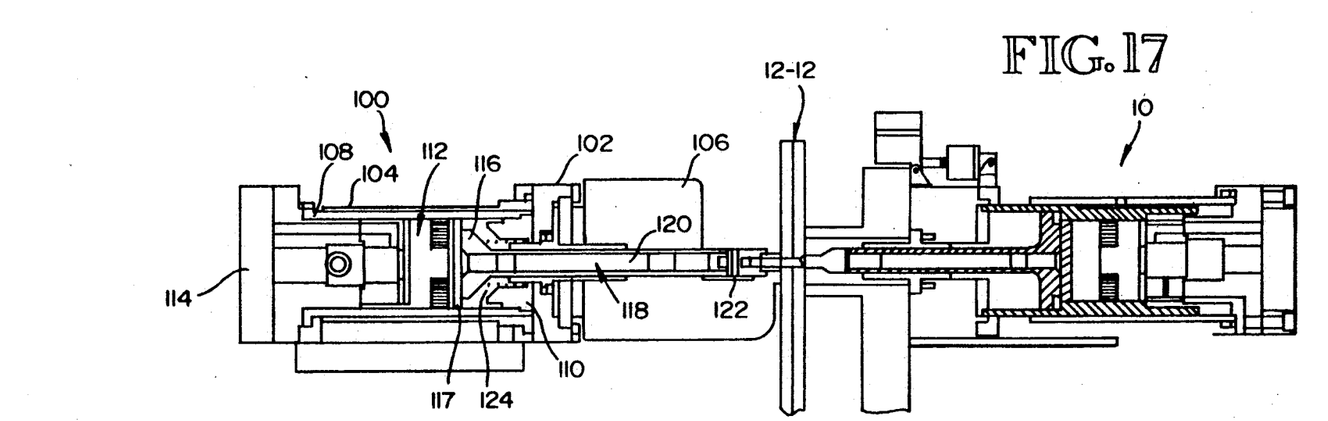
FIGS. 17 and 18 are partial cross-section, top plan views showing the operation of the complete collar swaging apparatus, in conjunction with the bolt insertion apparatus.
Figure 18:
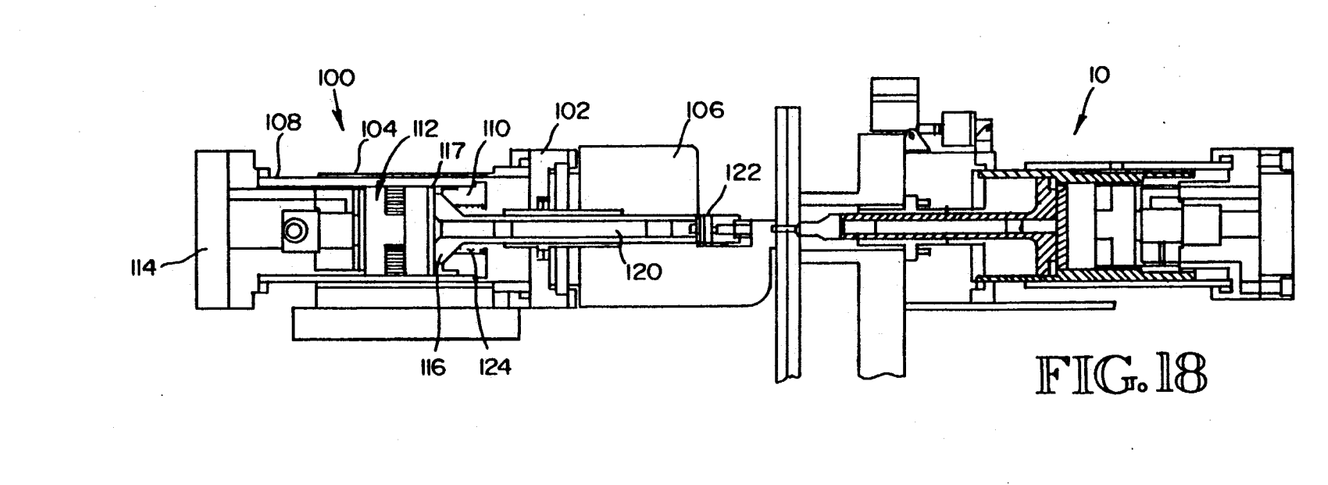

After the bolt has been inserted through the parts to be fastened by the apparatus discussed above in an interference fit, a nut or collar must be positioned on the extending end 83 of the bolt. A nut may be placed on the bolt by conventional apparatus. A collar, however, may be positioned and swaged onto the bolt by another part of the present invention. FIGS. 17 and 18 show a collar swaging system which includes the bolt insertion apparatus 10 described above and a collar swaging apparatus referred to generally at 100. FIGS. 5–7 show the steps in the collar swaging process using the bolt insertion apparatus 10 as a backup against the head of the bolt.

The collar swaging apparatus 100 includes an electromagnetic actuator system. This includes a front plate 102, an outer sleeve member 104 and a forward positioning (pressure foot) member 106, which are all connected together to form a single structural unit. An inner sleeve member 108 slides longitudinally within outer sleeve 104. At the forward end of inner sleeve member 108 is a hardstop 110. To the rear of hardstop 110 is a coil assembly 112 and extending rearwardly therefrom is a recoil mass shown generally at 114. The inner sleeve member 108, the forward hardstop 110, the coil assembly 112 and the recoil mass 114 are connected to form a single structural unit.

In the interior space between the forward end of coil assembly 112 and hardstop 110 is the central portion 116 of driver 118. Driver 118 also includes a rear actuator plate 117 connected to the rear surface thereof. Driver 118 further includes an extending forward portion 120, which extends through a central opening in forward plate 102. At the forward end of extending portion 120 is a die shown generally at 122, which receives collars to be inserted onto the ends of bolts and then swaged and which will be discussed in more detail in the following paragraphs. The rear surface of hardstop 110 may either be flat or conical, matching the front surface of central portion 116 of the driver, as shown in FIGS. 17 and 18. Typically, driver 118 is maintained relatively toward the rear of the apparatus by a spring 124.

During the time that the opening for the bolt is drilled in the parts to be fastened and the bolt inserted by opposing bolt insertion apparatus 10, the driver of the collar swaging apparatus 100 is in a standoff position, with die 122 relatively away from the workpiece, as shown in FIG. 5. When a collar is to be swaged onto the end of an inserted bolt, the driver 34 of the bolt insertion apparatus 10 is positioned up against the head of the bolt, as shown in FIGS. 17 and 18, and in FIGS. 6 and 7.

FIGS. 8–13 show the system for loading a collar onto the collar die 122 in the collar swaging apparatus. This is accomplished by a transfer arm assembly 124, shown generally at 124. The transfer arm assembly is connected to the collar swaging apparatus 100 near the front end thereof, off axis from the extending portion 120 of driver 118 and die 122. In the collar loading process, a collar is first moved via an escapement mechanism (not shown) from a supply of collars which can be located remotely from the collar swaging apparatus. An individual collar is moved down a pneumatic tube or hose (not shown) into a loader mechanism shown generally at 130 in FIG. 13. The collar is moved into a central opening 131 in the loader mechanism, up against the end of a transfer pin 132 which extends from one end of a split transfer arm shown generally at 134.

Figure 13:
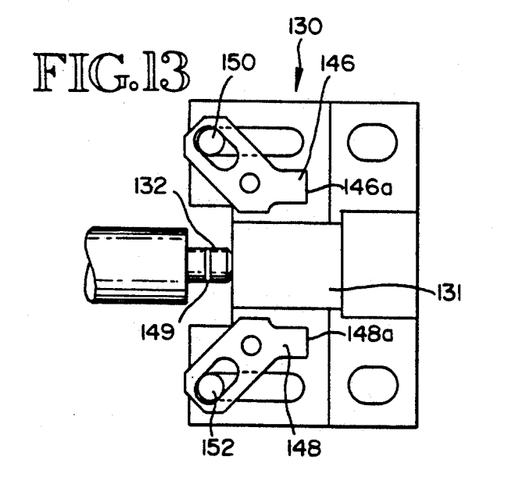
FIG. 13 is a top plan view showing a collar moving assembly used with the apparatus of FIGS. 8-12.

The collar is pushed onto transfer pin 132 by means of rotating elements 146 and 148. Elements 146, 148 are mounted on movable pins 150 and 152, which move longitudinally under the control of an air cylinder (not shown). When the collar is moved against the end of transfer pin 132, the air cylinder is activated, which moves the pins 150, 152, rotating the two elements 146, 148, such that free ends 146a, 148a thereof move against one end of the collar, forcing the collar onto the transfer pin against the frictional restraint of an O-ring 149 thereon.

Figure 8:
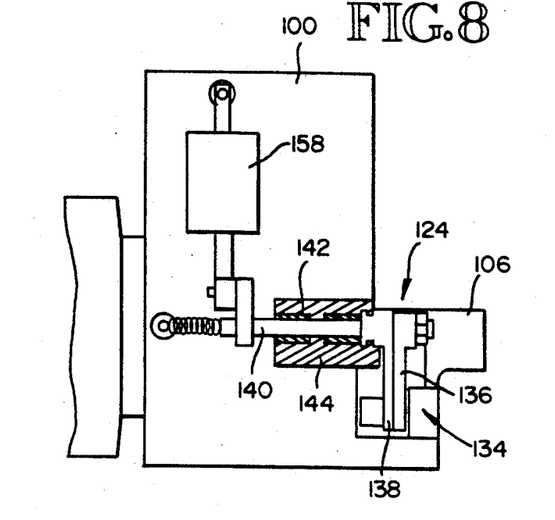
FIG. 8 is a partial cross-section, elevational view showing the collar-loading portion of the collar swaging apparatus of the present invention.
Figure 10:
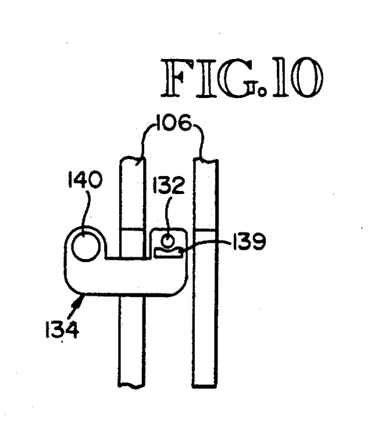
FIG. 10 is an elevational view showing a portion of the apparatus of FIGS. 8 and 9.

FIG. 8 shows an elevational view of the split transfer arm in relation to the overall collar swaging apparatus, while FIG. 10 shows the transfer arm itself. The split transfer arm 134 includes a forward holder portion 136 and a rear stripper portion 138. The forward holder portion 136 is secured to a horizontal rod 140 which is mounted in bearings 142 in a bearing housing 144 so that it can rotate therein. Rod 140 is also capable of moving longitudinally with the holder portion 136 moving longitudinally therewith. The rear stripper portion 138 is also mounted on horizontal rod 140, but is fixedly mounted longitudinally in the bearing housing 144, such that it is capable of rotating with holder portion 136, but cannot move longitudinally with the rod 140 and holder portion 136. Transfer pin 132 extending from the rear surface of holder portion 136 extends through an opening in stripper portion 138 and a short distance to the rear thereof.

Figure 9:
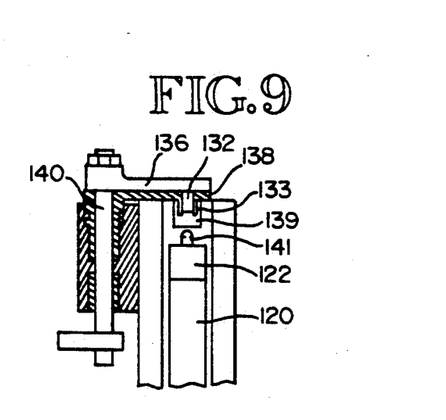
FIG. 9 is a partial cross-section, top plan view of a portion of the apparatus of FIG. 8.

In operation, with a collar 133 in place on transfer pin 132, which initially is off axis from driver 118, rod 140 is rotated, which rotates the entire split transfer arm 134, placing the collar in registry with die 122 at the forward end of driver 118. This is referred to as the load position of the transfer arm and is shown in FIG. 9, viewed from the bottom of the apparatus. The rotation of rod 140 is accomplished by an air cylinder 158.

The forward holder portion 136 of split transfer arm 134 also includes a raised bumper portion 139 which extends to the rear of holder portion 136 from the rear surface, through a corresponding opening in stripper portion 138. Bumper portion 139, which could be a pin or other element, is in the vicinity of transfer pin 132, as shown in FIG. 10 in the embodiment shown.

Figure 11:
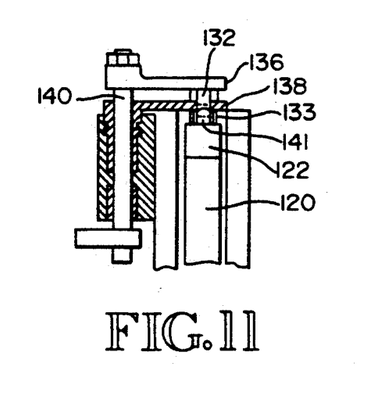
FIG. 11 is a partial cross-section, bottom plan view showing the apparatus of FIGS. 8-10 in a collar-stripping position.

In the next step, shown in FIGS. 9 and 11, driver 118 with die 122 is moved forwardly, such that a projecting collar holding pin 141 at the front end of die 122 comes into contact with and is registry with transfer pin 132. The holding pin 141 and transfer pin 132 are identical in configuration. At the same time, die 122 comes into contact with the end of the raised bumper portion 139. Driver 118 is then moved more forwardly, thereby pushing holder portion 136 forwardly by interaction of the bumper portion 139 and the die 122. Stripper portion 136, however, remains in place. This results in the collar 133 being forced off transfer pin 132 onto holding pin 141 in die 122. At the completion of this action, collar 133 has been, in effect, stripped from transfer pin 132 and is in position on holding pin 141. This "strip" position is shown in FIG. 11.

Figure 12:
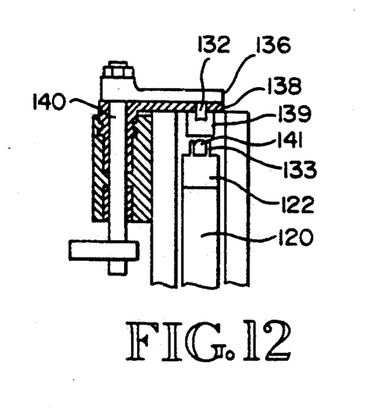
FIG. 12 is a partial cross-section, bottom plan view showing the apparatus of FIGS. 8-10 in position with the collar loaded on the collar swaging die.

At this point, driver 118 and die 122, along with holding pin 141 and collar 133 thereon, are moved slightly to the rear, permitting holder portion 136 to move rearwardly, to a position adjacent stripper portion 138. This is shown in FIG. 12. At this point, air cylinder 158 is again activated to rotate the entire split transfer arm 134 away from the driver i.e. off axis from the movement of the driver 118.

The above described arrangement is significant because it accomplishes a reliable automatic positioning of a collar onto a collar die even with a typical relatively small clearance between the swaging die and the workpiece, including the pressure foot member 106, at the forward end of the apparatus. It is also important that the above-described apparatus is mounted on the collar swaging apparatus itself and thus forms a part of the apparatus, instead of being completely separate therefrom.

Figure 14:
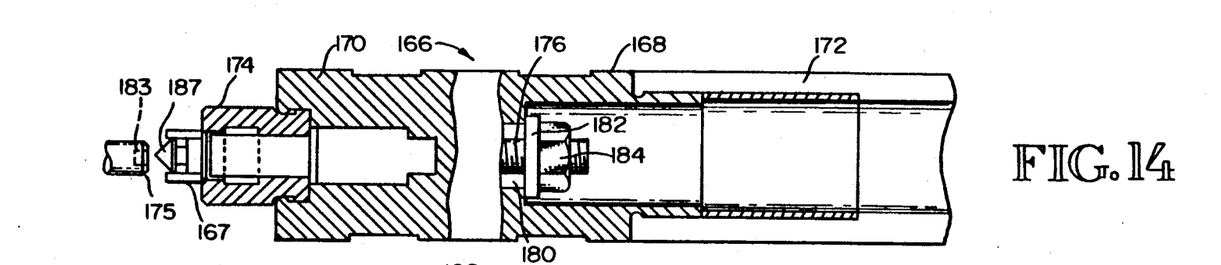
FIGS. 14 and 15 are partial cross-section, top plan views showing the collar-alignment apparatus of the present invention.
Figure 15:
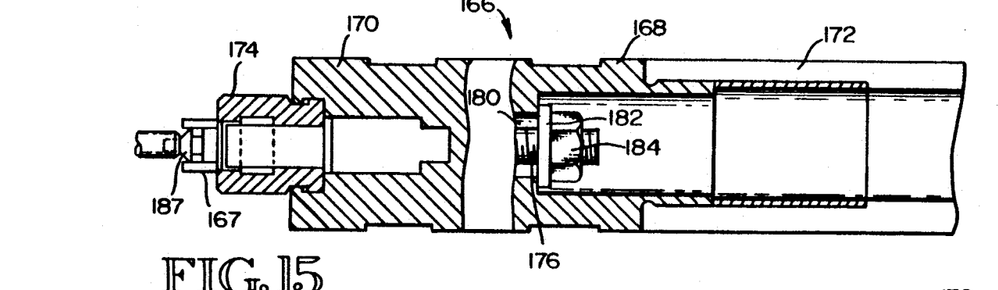
Figure 16:
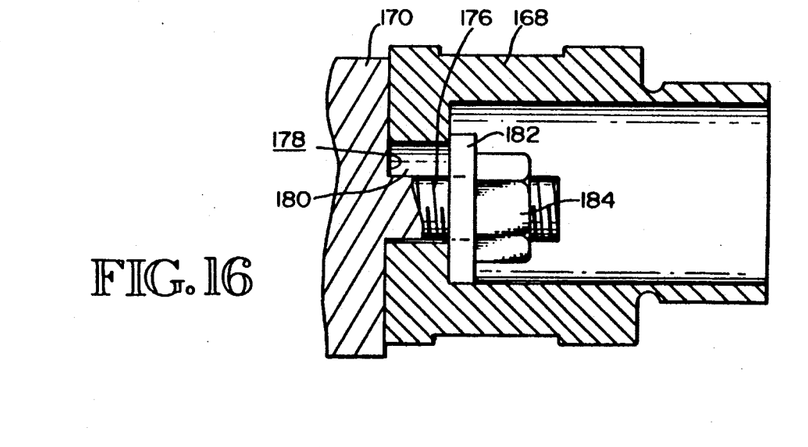
FIG. 16 is a cross-sectional view showing a portion of the apparatus of FIGS. 14 and 15.

FIGS. 14, 15, and 16 show another feature useful in the collar swaging apparatus of the present invention. This feature concerns a particular collar die structure 166. This arrangement is directed toward correcting minor misalignments between a swaging die (holding the collar) and the extending end of a bolt. Typically, when a collar 167 is located onto extending tail 175 of a bolt, the collar swaging tool 174, located on the end of die 166, must be concentric relative to the bolt within a very close tolerance, typically a few thousandths of an inch. If swaging tool 174 happens to be slightly misaligned, or somewhat nonconcentric, collar 167 typically will not slide evenly over the extending end 175 of the bolt, but will jam on the tip of the bolt, which in turn will interrupt the automatic operating cycle of the apparatus. This alignment requirement in the past has added significantly to the difficulty of automatically swaging collars onto bolts.

The particular die shown in FIGS. 14–16 solves this problem. The die shown generally at 166 is referred to herein as a "compliant" die. The compliant die 166 comprises two portions, a rear portion 168 and a forward portion 170. Rear portion 168 is firmly secured to the front of driver 172, as with conventional dies. Forward portion 170 holds the conventional collar swaging tool 174 at its front end thereof, which in turn holds collar 167, again similar to conventional dies. However, the rear and forward portions 168 and 170 are connected together in such a manner as to permit a slight lateral sliding relative to each other, typically within the range of 0.01–0.05 inches radially, for a ¼ inch diameter bolt. In the embodiment shown, a threaded central pin 176 extends from rear surface 178 of forward portion 170. This central pin 176 extends through an opening 180 in the forward end of rear portion 168. A flat, washer-like element 182 is positioned around central pin 176 and a nut 184 is threaded onto the end of central pin 176. The central pin includes a shoulder portion (not shown) against which the nut 184 is tightened. Typically, there is a small clearance, such as 0.001 inches, between the forward surface of the shoulder and the rear surface of the forward end of rear portion 168, to permit a sliding of forward portion 170 laterally relative to the rear portion 168, in a manner set forth below.

In operation, compliant die 166 and driver 172 will be moved forwardly until a center pin 187, on which collar 167 is held, the end of which pin is configured to taper to a point, mates with a recess 183 or opening in tail end 175 of the bolt. Such a recess is typical in such bolts. As the tapered center pin 187 enters the recess 183, it tends to align with the recess, if necessary, since the forward portion 170 of the compliant die is free to slide laterally a slight amount. The tapered center pin 187 bottoms into the recess before the collar 167 is pushed onto the tail of the bolt, producing a reliable and accurate alignment of the collar 167 relative to the tail of the bolt, before the collar begins to move over the end 175 of the bolt. The driver 172 is then driven forward and collar 167 is pushed onto the tail 175 of the bolt. The driver 172 is then driven further forward, resulting in the swaging of the collar 167 onto the bolt in conventional fashion.

While the above arrangement shows the use of a center pin 176 extending from the rear of forward portion 170 of the die and a central opening in the rear portion 168, other physical arrangements could be provided, such as a square or dove-tail slot, to permit a convenient lateral sliding of the two elements. Furthermore, the alignment mechanism could reference the outside of the bolt instead of an inner recess, such as through the use of arms which engage the outside diameter of the bolt. Again, the relative pressure on the arms will force, if necessary, the forward portion of the die to slide laterally so as to bring the collar into alignment for movement thereof onto the end of the bolt.

Referring again to FIGS. 17 and 18, a still further feature of the collar swaging apparatus of the present invention is shown. Occasionally, in the installation and swaging of the collars, the swaging die will become stuck onto the tail of the bolt as the swaging occurs. This occurs particularly with relatively thin-walled collars. It often takes a substantial amount of force to pull the collar swaging die free from the swaged collar. This process is called stripping the collar. In applicant's invention, the recoil effect of the recoil mass 114 in the collar swaging apparatus is used to strip the swaging die 122 from the collar. When the apparatus is fired, resulting in driver 118 being moved forwardly and the collar swaged, recoil mass 114 which is positioned behind coil assembly 112 but physically connected thereto as well as to inner sleeve 108 and hardstop 110, will move rearwardly, due to the repulsion effect between the driver 118 and the coil. As the recoil mass moves rearwardly, hardstop 110 will also move rearwardly, shortly contacting the forward surface of the central portion 116 of the driver 118. Continued rearward movement of the recoil mass 114 will result in continued rearward movement of the driver 118, thus pulling or stripping the swaging die 122 off of the swaged collar.

The initial gap between driver 118 and hardstop 110 is selected such that driver 118 has an adequate amount of forward travel space to swage the collar onto the bolt, but not significantly more, so that recoil mass 114 need only move a relatively short distance rearwardly before hardstop 110 contacts the driver and pulls the driver and the swaging die off the swaged collar. The initial gap is adjustable to accommodate different diameter collars, such as by ball-screw arrangements or the like, by adjusting the initial relative positions of the hardstop and the coil assembly 112, against which the driver 118 is initially positioned by the action of spring 124. Typically, for a one-quarter inch diameter titanium bolt, a gap of three-quarters inch provides adequate travel for both collar and stripping. An adequate range for a variety of bolt sizes, might be ½ inch to 1¼ inches. As indicated above, the configuration of the rear surface of the hardstop 110 can be varied, including flat or conical configurations, although a conical surface does have an advantage in diffusing shockwaves, while a flat surface will usually be easier to manufacture.

Hence, an apparatus has been disclosed which is capable of providing a reliable, automatic insertion of bolts using electromagnetic actuators. It should be understood that the actuator may have various arrangements, including an arrangement where the coil is connected to the driver and the actuator member is positioned to the rear thereof. The actuator member could also be a coil. The apparatus disclosed includes structure for automatically positioning a collar onto a swaging collar die and for aligning the collar onto the tail of the inserted bolt and for thereafter swaging a collar onto the bolt. The apparatus further is arranged to reliably and automatically remove the swaging die from the swaged collar.

Although a preferred embodiment of the invention has been disclosed herein for illustration, it should be understood that various changes, modifications and substitutions may be incorporated in such embodiment without departing from the spirit of the invention which is defined by the claims as follows:

What is claimed is:

1. An electromagnetic apparatus for driving bolts having a head portion between a first, undriven position and a second, desired driven position in an opening in a workpiece resulting in an interference fit, comprising:
  a driver means having a first, forward portion which is adapted to receive a tool and a second, rear portion, wherein the tool is for impact against a head of the bolt to drive the bolt into the opening;
  an actuator system which includes an actuator member which is receptive to the establishment of eddy currents therein and a coil which is positionable in close proximity to said actuator member, wherein one of the coil and the actuator member is connected to the driver;
  a source of stored charge which produces a large, short duration current pulse through the coil when connected thereto;
  a forward member with a hard stop element positioned on a rear surface thereof, the forward member and the hard stop element having an opening therethrough, through which the forward portion of the driver extends;
  means for positioning the forward member such that the distance between the rear portion of the driver and the hard stop element prior to activation of the driver is approximately equal to the distance between the tool and the preselected driven position of the bolt head; and control means for selectively connecting the stored charge to the coil to produce a large, short duration pulse in the coil which in turn results in eddy currents being established in the actuator member, repelling the driver means toward the bolt head with sufficient force that the driver means obtains a momentum prior to impact between the tool and the bolt head sufficient to drive the bolt into the opening in an interference fit.

2. An apparatus of claim 1, wherein said initial gap is within the range of 0.1–4 inches.

3. An apparatus of claim 1, wherein the momentum achieved by the driver means prior to impact is within the range of 1–60 kilogram meters per second.

4. An apparatus of claim 1, wherein the actuator member is a plate which forms a rear portion of the driver means and wherein the apparatus includes a spring member which biases the driver means initially substantially in contact with the coil.

5. An apparatus of claim 1, including the hardstop element positioned on the rear surface of the forward mass member, which a portion of the driver means contacts, stopping the forward motion of the driver and absorbing a substantial portion of energy present in the driver means.

6. An apparatus of claim 5, including a shock-absorbing bumper element positioned between said hardstop element and said portion of the driver.

7. An apparatus of claim 5, wherein the hardstop element is made from polyurethane and has a flat rear surface.

8. An apparatus of claim 5, wherein the momentum of the driver means is substantially more than necessary to produce an interference fit for the bolt and wherein remaining energy from the momentum of the driver means is substantially absorbed by the hardstop element.

9. An apparatus of claim 1, including a forward element and an inner sleeve member connected to and extending rearwardly from a rear surface of the forward member, defining an interior volume which contains the actuator member portion of the driver, wherein the apparatus further includes an outer sleeve member which fits around the inner sleeve member and which includes a recoil mass at the rear end thereof, wherein the coil is connected to the recoil mass and extends forwardly thereof, the coil being configured to fit within the inner sleeve member, the outer sleeve member being movable longitudinally relative to the inner sleeve member.

10. An apparatus of claim 9, wherein the inner sleeve member includes a stop portion on its interior surface preventing further movement of the driver means to the rear of the apparatus during recoil of the driver means, and wherein the outer sleeve member and the coil are arranged such that the coil moves sufficiently to the rear of the stop portion prior to arrival of the driver to prevent contact between the driver means and the coil during recoil of the driver.

11. An apparatus of claim 10, including a shock-absorbing bumper element positioned between the stop portion and the driver means.

12. An apparatus of claim 1, wherein the positioning means includes a spacer element which is positioned between the apparatus and a fixed reference surface.

13. An apparatus of claim 12, wherein the reference surface is a nosepiece.

14. An apparatus of claim 12, wherein the reference surface is the workpiece.

15. An apparatus of claim 12, wherein the spacer element is selectively movable from between the apparatus and the reference surface, permitting the tool portion of the driver means to be moved into contact with the head of the bolt without actuation of the apparatus.

16. An apparatus of claim 1, wherein the driver initially is positioned such that there is an initial gap between the tool and the head portion of the bolt.

17. An apparatus of claim 1, wherein the forward member has a mass which is more than twice that of the driver.

18. An apparatus of claim 1, wherein the driver is stopped at a point which does not result in overdriving or underdriving of the bolt.

19. An apparatus of claim 18, wherein the point is adjustable.

20. An apparatus of claim 1, wherein the hard stop element is made of plastic.

21. An apparatus of claim 1, wherein the distance between the rear portion of the driver and the hard stop element prior to activation of the driver is precisely equal to the distance between the tool and the desired driven position of the bolt head.

22. An electromagnetic apparatus to accomplish fastening operations, comprising:

a driver means having a first portion which is adapted to receive for impact against a fastener which is used to join two or more parts together;

an actuator system which includes an actuator member which is receptive to the establishment of eddy currents therein and a coil which is positionable in close proximity to said actuator member, wherein one of the coil and the actuator member is connected to the driver;

a source of stored charge which produces a large, short duration current pulse through the coil when connected thereto; control means for selectively connecting the stored charge to the coil to produce a large, short duration current pulse in the coil which in turn results in eddy currents being established in the actuator member, repelling the driver toward the fastener with sufficient force to accomplish a desired effect on the fastener; and a body assembly housing the driver means and the actuator system, wherein the body assembly includes a forward member having a central opening therein through which a forward portion of the driver extends, and an inner sleeve member connected to and extending rearwardly from a rear surface of the forward member, wherein the apparatus further includes an outer sleeve member which fits around the inner sleeve member and which includes a recoil mass at the rear end thereof, wherein the coil is connected to the recoil mass and extends forwardly thereof, the coil being configured to fit within the inner sleeve member, the outer sleeve member being movable longitudinally relative to the inner sleeve member.

23. An apparatus of claim 22, including a hardstop element positioned on the rear surface of the forward member, which a portion of the driver means contacts, stopping the forward motion of the driver and absorbing a substantial portion of energy in the driver means.

24. An apparatus of claim 22, wherein the inner sleeve member includes a stop portion on its interior surface preventing further movement of the driver means to the rear of the apparatus during recoil of the driver means, and wherein the outer sleeve member and the coil are arranged such that the coil moves sufficiently to the rear of the stop portion prior to arrival of the driver to prevent contact between the driver means and the coil during recoil of the driver.

25. An electromagnetic apparatus for driving fasteners between a first, undriven position and a second, desired driven position to accomplish fastening operations, comprising:

a driver means having a first, forward portion which is adapted to receive a tool and a second, rear portion, wherein the tool is for impact against a fastener which is used to join two or more workpiece parts together;

an actuator system which includes an actuator member which is receptive to the establishment of eddy currents therein and a coil which is positionable in close proximity to said actuator member, wherein one of the coil and the actuator member is connected to the driver;

a source of stored charge which produces a large, short duration current pulse through the coil when connected thereto;

a forward member with a hard stop element portioned on a rear surface thereof, the forward member and the hard stop element having an opening therethrough, through which the forward portion of the driver extends;

means for positioning the forward member such that the distance between the rear portion of the driver and the hard stop element prior to activation of the driver is approximately equal to the distance between the tool and the desired driven position of the fastener and such that the driver is stopped by contact between the rear portion of the driver and the hard stop element before the workpiece parts are damaged by the tool; and control means for selectively connecting the stored charge to the coil to produce a large, short duration current pulse in the coil which in turn results in eddy currents being established in the actuator member, repelling the driver means toward the fastener with sufficient force to accomplish a desired effect on the fastener.

26. An apparatus of claim 25, wherein the hard stop element is made of plastic.

27. An apparatus of claim 26, wherein the hardstop element is made from polyurethane and has a flat rear surface.

28. An apparatus of claim 25, wherein the forward member has a mass which is greater than that of the driver.

* * * * *